United States Patent Office 3,227,528
Patented Jan. 4, 1966

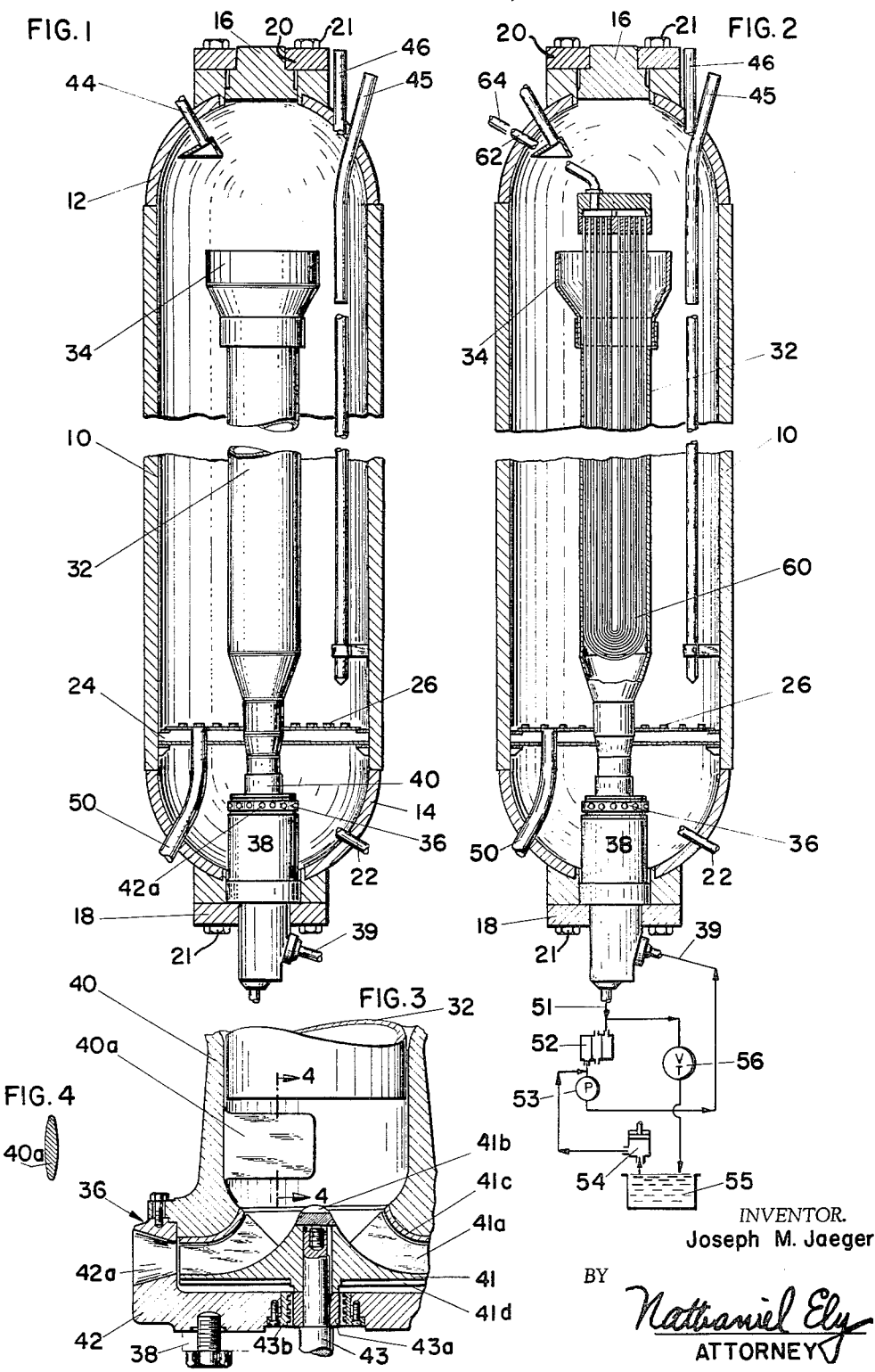

3,227,528
HIGH PRESSURE REACTION VESSEL
Joseph M. Jaeger, Woodcliff Lake, N.J., assignor to Hydrocarbon Research, Inc., New York, N.Y., a corporation of New Jersey
Filed Mar. 12, 1962, Ser. No. 178,847
5 Claims. (Cl. 23—289)

This invention relates to reactors wherein a liquid is internally circulated from one zone to another, as for example, in the control of the temperature of the reaction.

While my invention is applicable broadly to various types of a reaction, conversion, or mixing in which a liquid is present, the invention is particularly applicable to high temperature, high pressure reactions such as the hydrogenation of heavy hydrocarbon liquids. In accordance with the patent of Johanson, 2,987,465 for example, it has been found commercially desirable to maintain a liquid-gas-solids contact in which the solids are placed in ebullated or random motion in the liquid. This is accomplished by passing the liquids and gases, in continuous liquid phase, upwardly through a bed of particulate solids under such conditions as to accomplish a predetermined and controlled expansion of the bed over its settled volume. The random motion of the particles has been found to aid the gas-solids contact, lengthen the effective life of the solids if they are catalytic, and limit the pressure drop through the bed.

As an example of the foregoing, hydrogenation of heavy hydrocarbon oils under elevated temperatures in the order of 800° F. and under pressures in the order of 1000–5000 p.s.i.g. is accomplished by circulating the oil and hydrogen gas upwardly through a bed of particulate solids which may be as large as $\frac{1}{16}$ to $\frac{1}{4}''$, and more frequently are $\frac{1}{32}'' \times \frac{1}{8}''$ extrudates. Upgrading of the oil, removal of sulfur and organo-metal compounds, and other hydrogenation reactions can thus be accomplished in a highly effective manner.

A suitable upflow of liquid of this type at the temperatures involved for the type and size of particle forming the bed is usually in the range of 10 to 200 gallons per minute per square foot of horizontal cross section of the reactor. With such a liquid flow the bed of solids of the usual contact particles is expanded in the order of from 10 to 200% over the settled state of the solids. This expansion depends upon the size, shape, and density of the particles and on the viscosity and velocity of the liquid. By limiting such bed expansion, the random motion of the particles in the liquid can be made effective without carryover of particles. If the particles are of slurry size (of the order of 0 to 20 microns) the particles are carried in the liquid at a somewhat lower velocity.

To provide a suitable upflow of liquid and to control the temperature in the reactor, it is necessary as a rule, to have liquid recyle rates of the order of 3 to 20 times the amount of fresh feed. It has been suggested that external recycle circuits would be used. These necessarily require piping which must withstand the high temperatures and pressures in the reactor and usually must be protected against undesired heat transfer and leakage hazards especially with gases such as hydrogen. Such piping thus materially adds to the costliness of the reactor system. The alternative of providing an internal pump with an external driving means raises the added problem of stuffing boxes for the driving means and as these are subjected to vastly different pressure levels they tend to cause objectionable leakage. The provision of an internal driver under the high temperature and high pressure and other environmental conditions of the reactor requires especial provision for safety, avoidance of corrosion and erosion, cooling of the parts to avoid excessive stresses and provision for inserting the driver into and removal from the reactor.

My invention contemplates a novel construction of reactor systems for liquid-solids-gaseous reactions carried out at superatmospheric (or sub-atmospheric) pressures and temperatures to permit ease of control of the reaction and economy of construction of the reactor with a high degree of safety.

A more specific objective of my invention is to provide a highly efficient vertically mounted centrifugal pump having a nearly constant flow characteristic curve for varying pressure conditions which is adapted for positive external control and yet may be installed within a pressure reactor in such a manner as to assure long life and safe and economic operation, and one which is readily serviced for such use.

A still further object of my invention is to provide a pump and driver for a pressure vessel which are effective to carry out a controlled liquid flow at predetermined pressures such that an improved contact between the liquid, solids and gases under high recycle conditions is possible.

Further objects and advantages of my invention will appear from the following description of a preferred form of embodiment thereof taken in connection with the attached drawings in which:

FIG. 1 is a substantially central vertical cross section, with parts in elevation, of a reactor.

FIG. 2 is a substantially central vertical cross section, with parts in elevation, of a modified form of reactor utilizing an internal heat exchanger element.

FIG. 3 is a partial vertical section of the pump impeller disc and associated parts.

FIG. 4 is a transverse cross section of the flow splitter, taken substantially on the line 4—4 of FIG. 2.

As shown in FIG. 1, the reactor 10 for hydrocarbon oil hydrogenation is preferably a vertical cylindrical vessel of such wall construction that it will withstand fluid pressures in the order of 1000 to 5000 pounds per square inch gauge and temperatures in the order 750° to 1500° F. Such a vessel is provided with a dome-shaped head section 12 and similar base section 14 which are conveniently welded into a unit with the shell or side wall. The head section 12 and base section 14 have access ports closed by man-heads such as shown at 16. These will be clamped to the dome portions 12 or 14 as by flange rings 18 and 20 which will be bolted as at 21 and gasketed in a manner corresponding to approved high pressure vessel construction.

For the purpose of hydrogenation of a liquid, a reactant inlet for the hydrogen gas and liquid is provided at 22, such reactant in liquid phase passing through the lower portion of the reactor and mixing with the liquid discharged from the pump 36 hereinafter described. The total liquid and gas then pass upwardly through a distributor plate 24. This distributor plate may be provided with a series of bubble caps 26 which are commonly mounted on a perforated tray in a suitable manner to permit the reactant to flow upwardly through the reactor.

For hydrogenation purposes, the reactor is usually filled with a contact material which may be from the size of slurry, i.e, 0–20 microns to particulate solids such as $\frac{1}{32}'' \times \frac{1}{8}''$ extrudates and to accomplish the desired contact the liquid will flow upwardly through such a bed of contact materials at a rate of from 20 to 200 gallons per minute per square foot of horizontal cross section of the reactor. As this flow rate is normally above the expected feed rate, the total flow required is accomplished by recycling more or less of the liquid from the upper part of the reactor back to the bottom of the reactor.

By the use of my present invention, I now find it entirely practical to use an internal conduit 32 for such recycle. This conduit is preferably provided with an outwardly and upwardly flared bell top 34 which is located above any usual operating level of a catalyst and thus serves as an entrainment separator. A minimum of entrained gas or material is carried over into the central conduit 32 which extends downwardly to below the distributor tray 24. This conduit thus serves to supply the pump 36 which is required to accomplish sufficient pressure on the liquid to cause it to rise through the solids in the reactor and place them in random motion. Pump 36 may be driven as by the driver or motor 38 which may be gas, hydraulic, or electric and is mounted on the bottom manhead 18. As hereinafter described, it is hydraulic.

The inlet 40 to pump 36 is adapted to telescope in a slip fit over the exit of the conduit 32. This is designed so that the back-flow of liquid into the conduit 32 is a minimum and mechanical interference is prevented. A positive head on the pump impeller 41 is assured by the height of the liquid in conduit 32.

The impeller 41 is preferably of the semi-open type and has curved blades 41a which cooperate with diffuser section 42 of the pump. The diffuser section has a plurality of openings 42a which convert the liquid viscosity from said impeller vanes into pressure and thus discharges liquid through substantially 360° of the horizontal plane of the impeller 41. The bottom portion of the reactor serves as the pump body.

The pump 36 is especially arranged to minimize wear and erosion which might result from the handling of abrasive materials such as catalysts carried over with liquid from the entrainment separator 34. Bolting members to secure the pump 36 to driver 38 are out of contact with liquids and where liquid contact is inevitable such as the impeller nut 41b, it is hardened and streamlined. Removable wear plates 41c are used where considered necessary. The shroud of the impeller 41 is supplied with back vanes 41d which are radially applied to prevent the accumulation of solids in the area beneath the impeller and to reduce the differential pressure at a point in the area adjacent to the shaft sleeve 43a and labyrinth bushing 43b. The labyrinth bushing 43b for the pump may be provided with a flushing to aid in this function.

A splitter 40a, integral with pump inlet 40, avoids vortex formation and facilitates smooth flow to the eye of the impeller 41. This splitter 40a has the generally curved cross section shown in FIG. 4.

The impeller 41 has been designed to give a very steep head-capacity characteristic with a rise of approximately 20% from design point to shut-off. By speed control, the pump is capable of circulating the constant volume of liquid at differential pressures of 20 p.s.i., 10 p.s.i., 5 p.s.i. or lower. This speed control is accomplished by the regulation of the hydraulic feed pressure and flow.

The internal pump driver 38, as an hydraulic motor, has an oil control circuit shown in FIG. 2 including heat exchangers (coolers) 52, circulating pump 53, pressure inlet line 39 and pressure return line 51. Some of the discharge from pump driver 38 may pass through regulating valve 56 to atmospheric sump 55 in effecting desired control. Make-up and pressurizing is accomplished by pump 54 which discharges into the control circuit ahead of circulating pump 53. The external piping and apparatus is typical of hydraulic circuits and is shown diagrammatically.

In commercial practice, a reactor for hydrogenation of oil will be in the order of 15 to 45 or more feet in height. With such a liquid head there is available such a net positive suction head on the pump that, even with total pressures in the order of 3000 p.s.i.g. or more, the pump is capable of overcoming a differential of head of from as little as 5 p.s.i.g. to as much as 50 p.s.i.g. With a capacity of 80 g.p.m. per square foot to ebullate a bed of particles having a density of about 40 pounds per cubic foot and with a liquid at around 800° F. and with a liquid viscosity of about 0.5 centistoke and with a recycle to feed ratio of about 20 to 1, the pump will require approximately 15 driving horsepower. The pump drive preferably has a horsepower rating of two to three times as much which materially facilitates cooling in a hydraulic unit and provides low temperature rise in an electric unit.

A reactor for this service may also have additional elements including the vapor outlet 44, the catalyst inlet 45 thermowell 46 and catalyst drain 50.

It will be recognized that a fairly gas-free liquid having a maximum NPSH is essential for effective pump operation inasmuch as the liquid, at temperatures in the order of 800° F., even at high pressures, is close to or at the vaporization point. Furthermore, the central draft tube 32 permits a low velocity liquid flow to the pump inlet thus avoiding turbulence or excess pressure drop and minimized pump entrance losses that would also cause undesired vaporization with resultant cavitation.

The impeller 41 is especially arranged for full flow operation at relatively low rotor speed (in the order of 1140 r.p.m.). With a rotor only 12 to 14 inches in diameter, suitable for insertion through a manhead of only 18 inches in diameter, a flow rate of 25,000 barrels per day can be accomplished.

A highly advantageous feature of my arrangement is the absence of any external mechanical seals, stuffing boxes, or parts extending through the reactor. The pump driver is hydraulically energized and no unusual connections are required.

A modified form of construction is shown in FIG. 2 in which the similar parts which are the same as in FIG. 1 are indicated by the same number. In this form of construction, the central conduit 32 is provided with a suitable heat exchanger unit 60 which may have U-tubes suitably interconnected through lines 62 and 64 either with a cooling medium or a heating medium as desired.

In the hydrogenation of hydrocarbon oils it is sometimes convenient to introduce the cold hydrogen through the inlet 62 and discharge it through the outlet 64 to preheat the hydrogen and to reduce the temperature of the reaction zone, after which the heated hydrogen is used in the feed to the reactor.

Generally, I find it desirable to take suction for the pump 36 from the central tube 32. However, it will be appreciated that circulation can be accomplished by a modified pump design adapted to take in liquid from the outer perimeter of the reactor and discharge it up through the central tube.

Although reference has generally been made to superatmospheric pressures which require relatively heavy vessels and thus limits space for pump installation, it will be apparent that low (sub-atmospheric) pressure or temperature conditions may exist and it is equally as important to avoid external connections and provide an internally safe and secure construction.

Reference has been made to other uses of the reactor such as liquid mixers, reflux pumps, air separation towers, etc.

Modifications may be made to my invention which are within the scope and spirit of the description herein and of the claims appended hereinafter.

I claim:

1. In combination with a high pressure reaction vessel adapted for the liquid phase reaction of hydrocarbons and hydrogen under pressures in excess of 1000 p.s.i.g. and at temperatures in excess of 750° F. wherein the reaction takes place in the presence of contact particles and wherein the reaction vessel has means to introduce reactants thereto and means to withdraw liquid effluent therefrom, the improvement which comprises an internal, externally controllable, positive flow, recycle circuit including a substantially vertical conduit extending from an upper part of the reaction vessel to a lower part thereof, a pump in the lower part of the reaction vessel, said pump having a telescoping inlet member which engages the lower end of the vertical conduit, said pump having a casing, an impeller in said casing, said casing having a plurality of outlet ports which convert the liquid velocity from said impeller into a pressure sufficient to overcome the head on the outlet ports and force the liquid in a recycle path through liquid and contact particles in the reaction vessel to the upper part of the reaction vessel, and a pump driver integrated to said pump, said pump and driver being demountably mounted within and to the lower part of the reaction vessel, said pump driver having external means, independent of the reactants in the reaction vessel, for controllably driving said pump.

2. In the combination with the reaction vessel as claimed in claim 1, a pump construction having a plurality of vanes on the impeller and having such a number of outlet ports as to be substantially open through 360° of the horizontal cross section of the casing.

3. A reactor as claimed in claim 1 wherein said liquid conduit has a gas separating chamber at the upper part and a heat exchange bundle extending substantially throughout said conduit.

4. A reactor comprising a substantially cylindrical, vertically disposed, pressure vessel normally partly filled with particulate solids and liquid, a centrally disposed open tube within the vessel extending from near the bottom to above the normal operating level of the solids, and means within the reactor to recycle effluent liquid from the upper part of the reactor downwardly through the open tube and upwardly under pressure through said solids, said recycle means including a pump, said pump having a pump inlet member below and engaging the lower end of the tube to place a net positive suction head on the pump, said pump having a diffuser to discharge liquid and solids into the circulating path, a pump driver mounted within said reactor, and external means independent of the liquid within the reactor to energize and control the pump driver.

5. A reactor as claimed in claim 4 wherein said reactor has a bottom closure and said driver is mounted on said closure, and said driver and pump are integrated to permit the pump and driver to be removed as a unit from the reactor.

References Cited by the Examiner
UNITED STATES PATENTS

| | | | |
|---|---|---|---|
| 1,473,454 | 11/1923 | Albano | 259—108 |
| 1,936,308 | 11/1933 | Mueller | 23—285 X |
| 2,491,801 | 12/1949 | Debrey | 210—512 X |
| 2,566,795 | 9/1951 | Egger | 103—111 |
| 2,937,079 | 5/1960 | Van Pool | 23—285 |
| 2,955,924 | 10/1960 | Smith | 23—285 |
| 2,962,434 | 11/1960 | Pohlenz | 208—112 |
| 2,979,308 | 4/1961 | Putney | 260—683.59 X |
| 2,987,465 | 6/1961 | Johanson | 208—10 |
| 3,016,350 | 1/1962 | Butler | 208—264 |
| 3,020,228 | 2/1962 | Demeester | 208—264 |
| 3,124,518 | 3/1964 | Guzman et al. | 23—288.3 X |

FOREIGN PATENTS 1,066,545    10/1959    Germany.

MORRIS O. WOLK, *Primary Examiner.*

ALPHONSO D. SULLIVAN, *Examiner.*

S. P. JONES, J. SCOVRONEK, *Assistant Examiners.*